(12) United States Patent
Kita

(10) Patent No.: US 12,106,339 B2
(45) Date of Patent: Oct. 1, 2024

(54) INFORMATION PROCESSING APPARATUS, INFORMATION PROCESSING METHOD, AND PROGRAM

(71) Applicant: DAIKIN INDUSTRIES, LTD., Osaka (JP)

(72) Inventor: Kenji Kita, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/264,541

(22) PCT Filed: Jan. 31, 2022

(86) PCT No.: PCT/JP2022/003604
§ 371 (c)(1),
(2) Date: Aug. 7, 2023

(87) PCT Pub. No.: WO2022/172798
PCT Pub. Date: Aug. 18, 2022

(65) Prior Publication Data
US 2024/0046326 A1    Feb. 8, 2024

(30) Foreign Application Priority Data
Feb. 12, 2021    (JP) .................. 2021-020631

(51) Int. Cl.
*G06Q 30/0283*    (2023.01)
*H04L 12/14*    (2024.01)
(52) U.S. Cl.
CPC ..... *G06Q 30/0284* (2013.01); *G06Q 30/0283* (2013.01); *H04L 12/14* (2013.01)

(58) Field of Classification Search
CPC ................... G06Q 30/0283; H04L 12/14
(Continued)

(56) References Cited

U.S. PATENT DOCUMENTS

| 2012/0005032 A1* | 1/2012 | Bunk | G06Q 30/0601 705/26.1 |
| 2017/0262343 A9* | 9/2017 | Naganuma | H04L 67/52 |
| 2019/0349210 A1* | 11/2019 | Nayak | H04M 15/58 |

FOREIGN PATENT DOCUMENTS

| JP | 2013-20298 | 1/2013 |
| JP | WO2014/024251 | 2/2014 |

(Continued)

OTHER PUBLICATIONS

H. Li, Y. Yang and B. Zheng, "Research on Billing Strategy of Cloud Storage," 2012 Fourth International Conference on Multimedia Information Networking and Security, Nanjing, China, 2012, pp. 624-627. (Year: 2012).*

(Continued)

*Primary Examiner* — Jeff Zimmerman
*Assistant Examiner* — Hunter A Molnar
(74) *Attorney, Agent, or Firm* — IPUSA, PLLC

(57) ABSTRACT

To appropriately determine the usage fee for each business operator of a system using a cloud service. An information processing apparatus includes a calculating unit configured to calculate a usage fee relating to a cloud service with respect to each of a plurality of business operators, based on information relating to a number of devices managed by each of the plurality of business operators by using the cloud service, and information relating to a usage record of using the cloud service by each of the plurality of business operators.

7 Claims, 8 Drawing Sheets

(58) Field of Classification Search
USPC .......................................................... 705/418
See application file for complete search history.

(56) References Cited

FOREIGN PATENT DOCUMENTS

| JP | 2017-162152 | | | 9/2017 | | |
|----|-------------|---|---|--------|---|---|
| JP | 2018-170715 | | | 11/2018 | | |
| JP | 2019-160130 | | | 9/2019 | | |
| KR | 20220006332 A | * | 1/2022 | ....... | G06Q 10/06313 |

OTHER PUBLICATIONS

Feb. 7, 2013, No. 827, pp. 90-93 p. 93, left paragraph, line 5 to middle paragraph line 8, (Nikkei Computer), non-official translation (Toga, Kei. The basics of private cloud that can't be asked anymore (2nd), Planning phase that holds the key to success or failure: Consider from the perspective of application migration and operation.) with English concise explanation.

International Search Report for PCT/JP2022/003604 mailed on Apr. 26, 2022.

International Preliminary Report on Patentability for PCT/JP2022/003604 mailed on Aug. 24, 2023.

* cited by examiner

FIG.5

| DEVICE ID | BUSINESS OPERATOR ID | FACILITY ID | STATE REGISTRATION FREQUENCY | DEVICE DATA |
|---|---|---|---|---|
| DEVICE 40A-1 | BUSINESS OPERATOR A | FACILITY A | FREQUENCY A | DEVICE DATA A-1 |
| DEVICE 40A-2 | | | FREQUENCY A | DEVICE DATA A-2 |
| ... | | | ... | ... |
| ... | BUSINESS OPERATOR B | ... | ... | ... |
| DEVICE 40B-1 | | | ... | ... |
| ... | ... | ... | ... | ... |

| BUSINESS OPERATOR | ALLOCATION AMOUNT OF FIRST FEE (DOLLARS) | ALLOCATION AMOUNT OF SECOND FEE (DOLLARS) |
|---|---|---|
| BUSINESS OPERATOR A | 200 | 240 |
| BUSINESS OPERATOR B | 100 | 210 |
| BUSINESS OPERATOR C | 40 | 90 |

INFORMATION PROCESSING APPARATUS, INFORMATION PROCESSING METHOD, AND PROGRAM

TECHNICAL FIELD

The present disclosure relates to an information processing apparatus, an information processing method, and a program.

BACKGROUND ART

Conventionally, a technology for constructing a system by using a cloud service (a public cloud service) has been known (see, e.g., Patent Document 1).

CITATION LIST

Patent Documents

[Patent Document 1]
  Japanese Unexamined Patent Application Publication No. 2018-170715

SUMMARY OF INVENTION

Technical Problem

However, there is a problem with the conventional technology that, for example, when two or more business operators jointly use a system using a public cloud service, the operation cost for each business operator may not be determined appropriately. The purpose of the present disclosure is to provide a technology that can appropriately determine the usage fee for each business operator of a system using a cloud service.

Solution to Problem

An information processing apparatus according to a first aspect of the present disclosure includes
  a calculating unit configured to calculate a usage fee relating to a cloud service with respect to each of a plurality of business operators, based on information relating to a number of devices managed by each of the plurality of business operators by using the cloud service, and information relating to a usage record of using the cloud service by each of the plurality of business operators. Accordingly, the usage fee for each business operator of the system using the cloud service can be appropriately determined.
  Further, the second aspect of the present disclosure is the information processing apparatus according to the first aspect, wherein the calculating unit determines the information relating to the number of the devices managed by each of the plurality of business operators by using the cloud service, based on information of each of the devices stored in the cloud service by a first API (Application Programming Interface) that registers a state of each of the devices.
  Further, the third aspect of the present disclosure is the information processing apparatus according to the first or second aspect, wherein the information relating to the number of the devices managed by each of the plurality of business operators by using the cloud service includes at least one of the number of the devices stored in the cloud service or a number of facilities in which the devices are installed.
  Further, the fourth aspect of the present disclosure is the information processing apparatus according to any one of the first to third aspects, wherein the calculating unit adds a weight to the number of the devices managed by each of the plurality of business operators by using the cloud service, based on a frequency of registering the information of each of the devices stored in the cloud service.
  Further, the fifth aspect of the present disclosure is the information processing apparatus according to any one of the first to fourth aspects, wherein the information relating to the usage record of using the cloud service includes at least one of a number of times of using the cloud service, an amount of data stored in the cloud service, an amount of communication data in the cloud service, a length of time of using the cloud service, or a specification of a server used in the cloud service.
  Further, the sixth aspect of the present disclosure is the information processing apparatus according to the fifth aspect, wherein the information relating to the usage record of using the cloud service includes information indicating a number of times of executing, by each of the plurality of business operators, a second API that is provided by the cloud service.
  Further, the seventh aspect of the present disclosure is the information processing apparatus according to the sixth aspect, wherein
  the second API includes APIs each providing one of a plurality of functions, and
  the information relating to the usage record of using the cloud service includes information relating to each API included in the second API.
  Further, the eighth aspect of the present disclosure is the information processing apparatus according to the seventh aspect, wherein the calculating unit adds a weight to the usage record of using the cloud service, based on a type of each of the APIs included in the second API.
  Further, the ninth aspect of the present disclosure is the information processing apparatus according to any one of the first to eight aspects, wherein
  the calculating unit calculates
    a first fee of the cloud service incurred by using a first API that registers a state of each of the devices provided by the cloud service, and
    a second fee of the cloud service incurred by using a second API provided by the cloud service,
  the calculating unit allocates the first fee to each of the plurality of business operators based on the information relating to the number of the devices managed by each of the plurality of business operators by using the cloud service, and
  the calculating unit allocates the second fee to each of the plurality of business operators based on the usage record of using the cloud service by each of the plurality of business operators.
  An information processing method according to a tenth aspect of the present disclosure is a method of executing a process by an information processing apparatus, the information processing method including
  calculating a usage fee relating to a cloud service with respect to each of a plurality of business operators, based on information relating to a number of devices managed by each of the plurality of business operators by using the cloud service, and information relating to a usage record of using the cloud service by each of the plurality of business operators.

A program according to an eleventh aspect of the present disclosure causes an information processing apparatus to execute a process, the process including calculating a usage fee relating to a cloud service with respect to each of a plurality of business operators, based on information relating to a number of devices managed by each of the plurality of business operators by using the cloud service, and information relating to a usage record of using the cloud service by each of the plurality of business operators.

BRIEF DESCRIPTION OF DRAWINGS

FIG. 5 is a diagram explaining an example of the information stored in a device DB (i.e., device database) according to the embodiment.

FIG. 9 is a diagram explaining an example of the processing in the server according to the embodiment.

DESCRIPTION OF EMBODIMENTS

Figure 1:
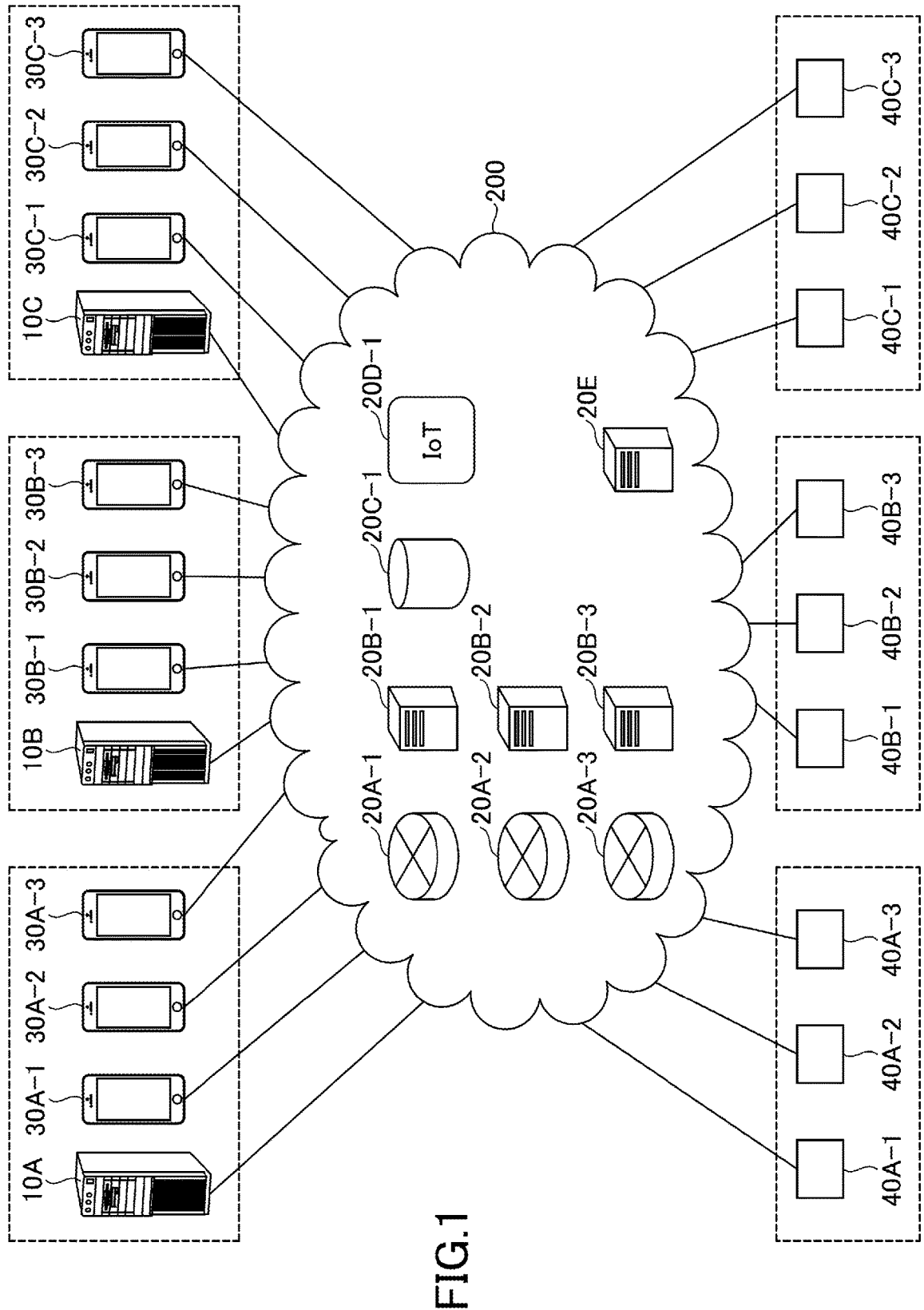
FIG. 1 is a diagram illustrating an example of the system configuration of a communication system according to the embodiment.

Each embodiment will be described below with reference to the drawings. In the present specification and the drawings, with respect to elements having substantially the same functional configuration, the same reference numerals are assigned to omit duplicate descriptions.

<System Configuration>

First, the system configuration of a communication system 1 is described. FIG. 1 illustrates an example of the system configuration of the communication system 1 according to the embodiment. As illustrated in FIG. 1, the communication system 1 includes a business operator server 10A, a business operator server 10B, and a business operator server 10C (hereafter, when it is not necessary to distinguish these from each other, these are simply referred to as the "business operator server 10").

Further, the communication system 1 includes a terminal 30A-1, a terminal 30A-2, a terminal 30A-3, a terminal 30B-1, a terminal 30B-2, a terminal 30B-3, a terminal 30C-1, a terminal 30C-2, and a terminal 30C-3 (hereafter, when it is not necessary to distinguish these from each other, these are simply referred to as the "terminal 30").

Further, the communication system 1 includes a device 40A-1, a device 40A-2, a device 40A-3, a device 40B-1, a device 40B-2, a device 40B-3, a device 40C-1, a device 40C-2, and a device 40C-3 (hereafter, when it is not necessary to distinguish these from each other, these are simply referred to as the "device 40").

Further, the communication system 1 includes a cloud system 200. The cloud system 200 includes servers 20A-1, 20A-2, 20A-3, . . . (hereafter, when it is not necessary to distinguish these from each other, these are simply referred to as the "server 20A"), servers 20B-1, 20B-2, 20B-3, . . . (hereafter, when it is not necessary to distinguish these from each other, these are simply referred to as the "server 20B".), servers 20C-1, . . . (hereafter, when it is not necessary to distinguish these from each other, these are simply referred to as the "server 20C"), servers 20D-1, . . . (hereafter, when it is not necessary to distinguish these from each other, these are simply referred to as the "server 20D"), and a server 20E. Hereafter, when it is not necessary to distinguish the server 20A, the server 20B, the server 20C, the server 20D, and the server 20E from each other, these are simply referred to as the "server 20").

The numbers of the business operator servers 10, servers 20, the terminals 30, and the devices 40 are not limited to the example in FIG. 1. The business operator server 10 and the server 20 are examples of "information processing apparatuses".

The business operator server 10, the server 20, the terminal 30, and the device 40 may be connected so as to be able to communicate with each other via a network NW (an example of a "second network") such as the Internet, a wireless LAN (Local Area Network), and a mobile phone network, for example. The mobile phone network may include a wireless communication system such as LTE (Long Term Evolution) and 5G (5th Generation Mobile Communications System), for example.

The business operator server 10 may be, for example, a personal computer or a computer for a server. The business operator server 10 may be operated, for example, by a business operator that provides predetermined functions (services) to users of the terminal 30 and the device 40.

The business operator server 10A, the business operator server 10B, and the business operator server 10C may be operated (managed) by a business operator A, a business operator B, and a business operator C, respectively. The terminal 30A-1, the terminal 30A-2, and the terminal 30A-3 may be the terminals of respective users to whom various services are provided by the business operator A. The terminal 30B-1, the terminal 30B-2, and the terminal 30B-3 may be the terminals of respective users to whom various services are provided by the business operator B. The terminal 30C-1, the terminal 30C-2, and the terminal 30C-3 may be the terminals of respective users to whom various services are provided by the business operator C.

The device 40A-1, the device 40A-2, and the device 40A-3 may be the devices of respective users to whom various services are provided by the business operator A. The device 40B-1, the device 40B-2, and the device 40B-3 may be the devices of respective users to whom various services are provided by the business operator B. The device 40C-1, the device 40C-2, and the device 40C-3 may be the devices of respective users to whom various services are provided by the business operator C.

The business operator A, the business operator B, and the business operator C may be, for example, the business operators that are affiliated with a particular business operator Z. In this case, the business operator A, the business operator B, and the business operator C may be, for example, business operators that operate in different countries from each other.

Each server 20 included in the cloud system 200 may be, for example, a server provided by a public cloud service provider. The server 20 may be a virtual computer (instance) in the public cloud service. Further, the server 20 may be such that, for example, the business operator Z and the like can specify values of specifications of, for example, the CPU, the memory, and the storage size, etc. The business operator A, the business operator B, and the business operator C may also be referred to as users of the cloud system 200 (public cloud service). According to the disclosed technology, for example, the business operator Z, etc., can centrally manage various kinds of data in the countries and regions where each business operator operates. Further, each business operator can jointly use data of other business operators. Thus, for example, each business operator can develop the device 40 and perform maintenance on the device 40 by using various kinds of data recorded in the cloud system 200. Further, each business operator can sell various kinds of data recorded in the cloud system 200 to a predetermined business operator. The predetermined business operator can, for example, determine the timing of delivery of packages to the home of the user of the device 40 based on the operation status of the device 40, which is an air conditioner.

The server 20A may be, for example, an instance of an API gateway service that provides functions such as API (Application Programming Interface) publishing, user authentication of the terminal 30, routing, and the like.

The server 20B may be, for example, an instance of a service that executes a code (a program, a script, a compiled execution code) that is preset by the public cloud service user in response to events that occur.

The server 20C may be, for example, an instance of a database service. The server 20D may be, for example, an instance that provides IoT services for authentication, data acquisition, management, etc., of Internet of Things (IoT) devices.

The server 20E calculates the operation cost of the cloud service for each business operator, for example, the business operator A, the business operator B, and the business operator C.

The terminal 30 may be, for example, an information processing terminal such as a smartphone, a tablet terminal, and a personal computer used by the user. The device 40 may be, for example, an edge server, an air conditioner, and various sensors.

<Hardware Configuration>

Figure 2:
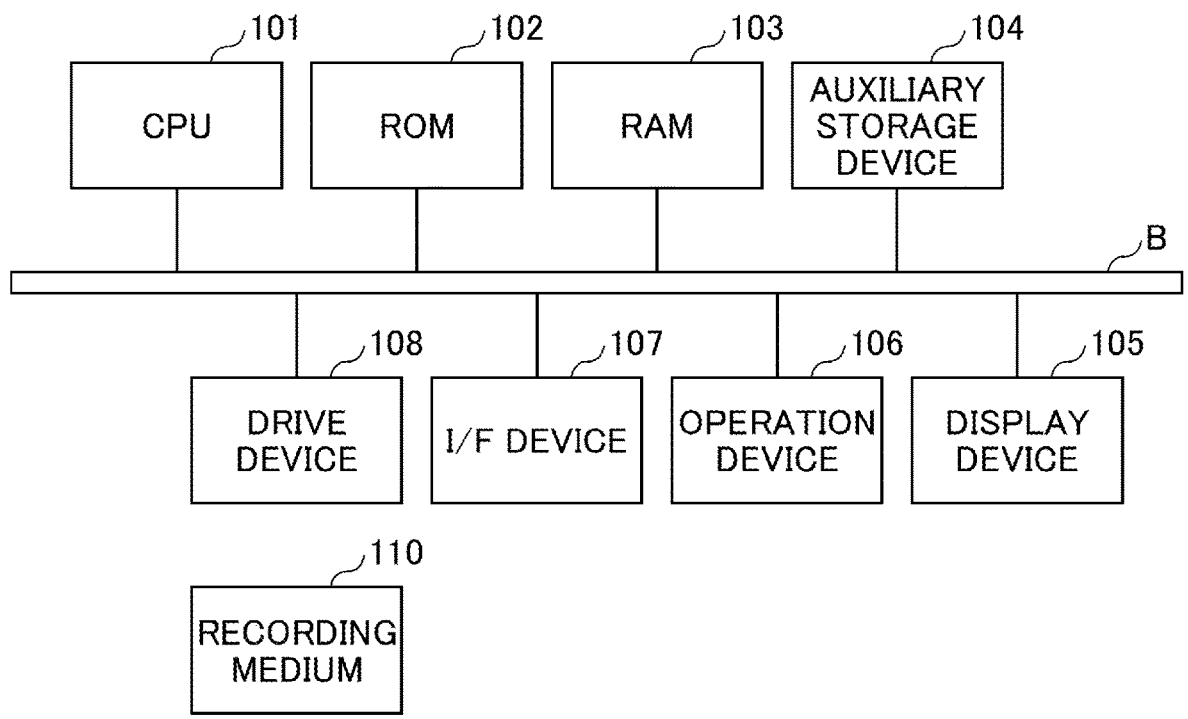
FIG. 2 is a diagram illustrating an example of the hardware configuration of a business operator server, a server, a terminal, and a device according to the embodiment.

Next, the hardware configuration of the business operator server 10, the server 20, the terminal 30, and the device 40 of the communication system 1 according to the embodiment will be described. FIG. 2 illustrates an example of the hardware configuration of the business operator server 10, the server 20, the terminal 30, and the device 40 according to the embodiment. In the following, the server 20 is described as an example. The hardware configuration of the business operator server 10, the terminal 30, and the device 40 may be the same as that of the server 20.

As illustrated in FIG. 2, the server 20 includes a CPU (Central Processing Unit) 101, a ROM (Read Only Memory) 102, and a RAM (Random Access Memory) 103. Further, the server 20 includes an auxiliary storage device 104, a display device 105, an operation device 106, an I/F (Interface) device 107, and a drive device 108. Each piece of hardware of the server 20 is connected to each other via a bus B.

The CPU 101 is an arithmetic device that executes various programs (e.g., machine learning programs, etc.) installed in the auxiliary storage device 104. The ROM 102 is a non-volatile memory. The ROM 102 functions as a main storage device and stores various programs, data and the like necessary for the CPU 101 to execute various programs installed in the auxiliary storage device 104. More specifically, the ROM 102 stores a boot program such as BIOS (Basic Input/Output System) or EFI (Extensible Firmware Interface).

The RAM 103 is a volatile memory such as a DRAM (Dynamic Random Access Memory) or an SRAM (Static Random Access Memory). The RAM 103 functions as a main storage device and provides a work area in which various programs installed in the auxiliary storage device 104 are deployed when the various programs are executed by the CPU 101.

The auxiliary storage device 104 stores various programs and information used when various programs are executed.

The display device 105 is a display device for displaying various kinds of information. The operation device 106 is an operation device for receiving various kinds of operations. The I/F device 107 is a communication device for communicating with external devices.

The drive device 108 is a device for setting a recording medium 110 therein. The recording medium 110 here includes media for recording information optically, electrically, or magnetically, such as a CD-ROM, a flexible disk, a magneto-optical disk, etc. The recording medium 110 may also include a semiconductor memory, etc., for electrically recording information, such as a ROM, a flash memory, etc.

Various programs installed in the auxiliary storage device 104 are installed, for example, when the distributed recording medium 110 is set in the drive device 108 and various programs recorded in the recording medium 110 are read by the drive device 108. Alternatively, various programs installed in the auxiliary storage device 104 may be installed by being downloaded from a network (not illustrated).

<Functional Configuration>

Figure 3:
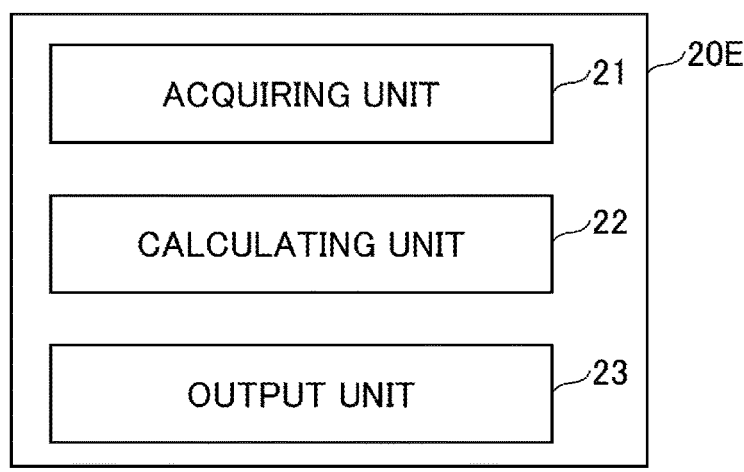
FIG. 3 is a diagram illustrating an example of the functional configuration of the server according to the embodiment.

Next, the functional configuration of the server 20E according to the embodiment will be described with reference to FIG. 3. FIG. 3 illustrates an example of the functional configuration of the server 20E according to the embodiment.

The server 20E includes an acquiring unit 21, a calculating unit 22, and an output unit 23. These units may be implemented by collaboration between, for example, one or more programs installed in the server 20E and hardware such as the CPU 101 of the server 20E.

The acquiring unit 21 acquires information from an external device such as the server 20. The calculating unit 22 calculates (determines) a usage fee during a predetermined period (for example, for a month) of the cloud system 200 for each business operator who is a user of the cloud system 200. The output unit 23 performs display or the like based on the usage fee for each business operator determined by the calculating unit 22. The output unit 23 may display the information on a screen of an external device, for example.

<Processing>

Next, an example of the processing of the communication system 1 according to the embodiment will be described with reference to FIGS. 4 to 8.

<<Registration of the State of the Device 40>>

Figure 4:
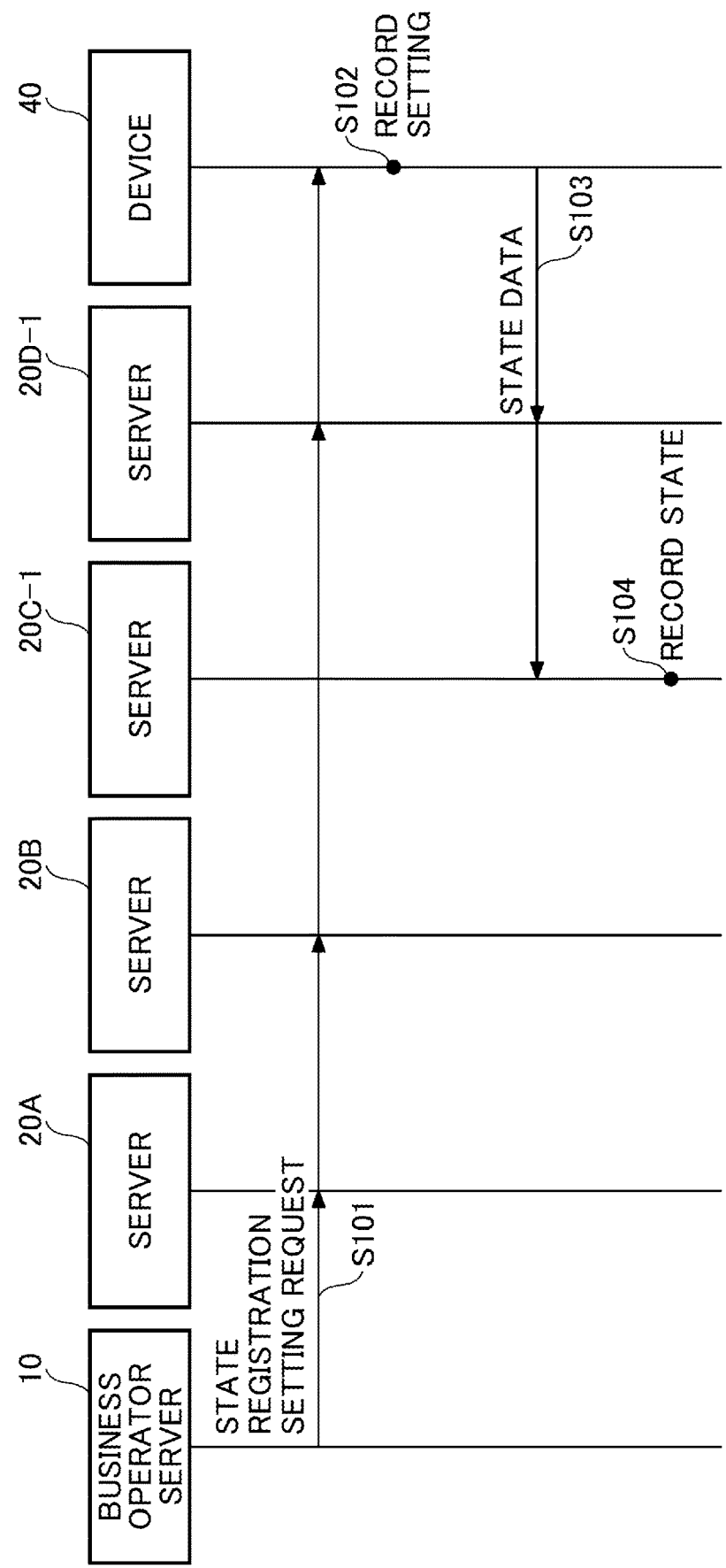
FIG. 4 is a sequence diagram illustrating an example of the processing of registering the state of the device according to the embodiment.

An example of processing for registering (updating) the state of the device 40 will be described with reference to FIGS. 4 and 5. FIG. 4 is a sequence diagram illustrating an example of processing for registering the state of the device 40 according to the embodiment. FIG. 5 is a diagram explaining an example of information stored in a device DB 501 (i.e., device database) according to the embodiment.

In step S101, the business operator server 10A transmits, to the device 40, a state registration setting request with respect to the device 40, via the server 20A (for example, the server 20A-3), the server 20B (for example, server 20B-3), the server 20D-1, etc. Here, the state registration setting request may include, for example, information such as the ID of the device 40 and the frequency of registering the state of the device 40. Here, the frequency of registering the state of the device 40 may be specified as, for example, every hour.

Information such as the ID of the device 40 and the frequency of registering the state may be specified by, for example, the manager of the facility (property) where the device 40 is installed or the user of the device 40. In this case, the business operator server 10A may send a state registration setting request when, for example, the business operator server 10A receives a request from the terminal 30A-1 that has received a predetermined operation from the user or the like.

Subsequently, the device 40 records settings such as the frequency of registering the state of the device 40 (state registration setting frequency) included in the received state registration setting request (step S102).

Subsequently, the device 40 transmits information indicating the state of the device 40 (device data) to the server 20C-1 via the server 20D-1 or the like by using the first API (Application Programming Interface) provided by the server 20D-1 of the cloud system 200 at the specified frequency (step S103). Here, if the device 40 is an air conditioner, the device data may include, for example, various settings related to the operation of the device 40 and various information measured by the device 40. The various settings related to the operation of the device 40 may include, for example, the operation mode (for example, heating, cooling, dehumidifying, blowing, etc.), airflow, set temperature, etc. The device 40 may be set to various settings related to the operation of the device 40 by the user from, for example, a remote controller of the device 40, the terminal 30A-1, etc. Further, the various types of information measured by the device 40 may include, for example, the indoor temperature and the indoor humidity.

Subsequently, the server 20C-1 records the received device data of the device 40 in the device DB 501 of the server 20C-1 (step S104). In the device DB 501, information about each device 40 stored in the cloud system 200 is recorded by the first API for registering the state of the device 40. In the example of FIG. 5, the device DB 501 records the business operator ID, the facility ID, the state registration frequency, and the device data corresponding to the device ID. The device ID is the identification information of the device 40. The business operator ID is the identification information of the business operator managing the device 40 by the cloud system 200. The facility ID is the identification information of the facility (property) where the device 40 is installed.

<<Remote Control>>

Figure 6:
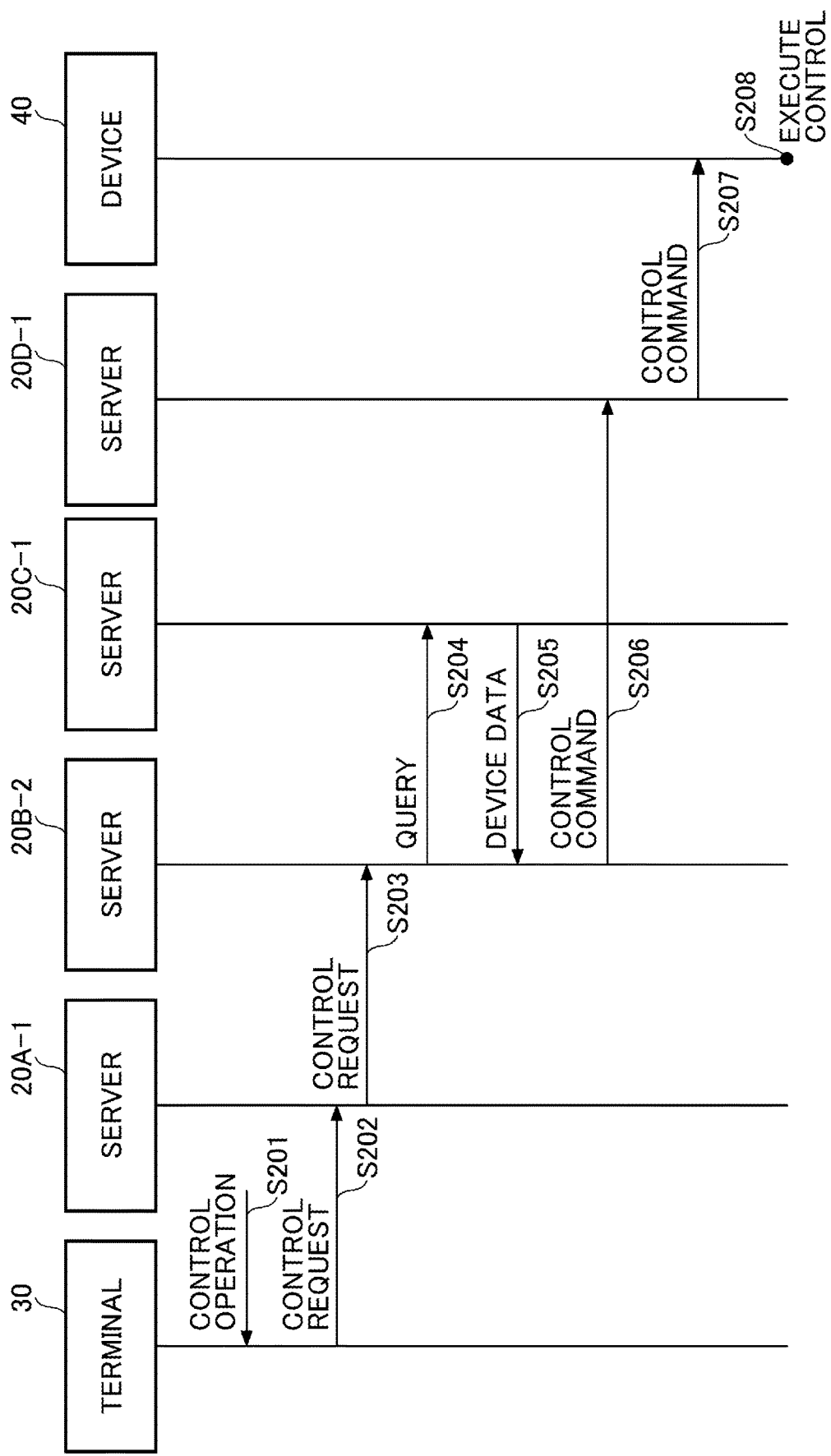
FIG. 6 is a sequence diagram illustrating an example of the processing in the remote control function according to the embodiment.

Next, referring to FIG. 6, an example of processing in providing the remote control function (an example of "first function") will be described. FIG. 6 is a sequence diagram illustrating an example of processing in the remote control function according to the embodiment.

In step S201, the terminal 30 receives an operation to control the device 40 from the user. Then, the terminal 30 uses the API (an example of "second API of type 1") for remote control provided by the server 20A-1 of the cloud system 200 to send a control request corresponding to the operation to the server 20A-1 (step S202). Here, the terminal 30 may send an HTTP (Hyper Text Transfer Protocol) request to the server 20A-1 that includes, for example, the ID of the API, the business operator ID, the device ID, and information specifying the control content in an item (field) of a Uniform Resource Locator (URL) or the like.

Then, the server 20A-1 transfers the control request to the server 20B-1 corresponding to the received control request (step S203). Here, the server 20A-1 may determine the transfer destination of the control request based on, for example, the URL (Uniform Resource Locator) of the control request received from the terminal 30.

Then, based on the received control request, the server 20B-1 sends a request (search query) to the server 20C-1 to acquire device data related to the device 40 stored in the device DB 501 (step S204).

Then, the server 20 C-1 sends the requested device data to the server 20B-1 (step S205). Here, the server 20C-1 sends the device data recorded in the device DB 501 of the server 20C-1 to the server 20B-1.

Then, the server 20B-1 sends a control command corresponding to the data and the control request to the server 20D-1 (step S206).

Then, the server 20D-1 sends the control command to the device 40 (step S207). Then, the device 40 executes control according to the received control command (step S208). Thus, the user of the terminal 30 can remotely perform operations such as raising the set temperature of the air conditioner by 1 degree Celsius.

<<Remote Monitoring>>

Figure 7:
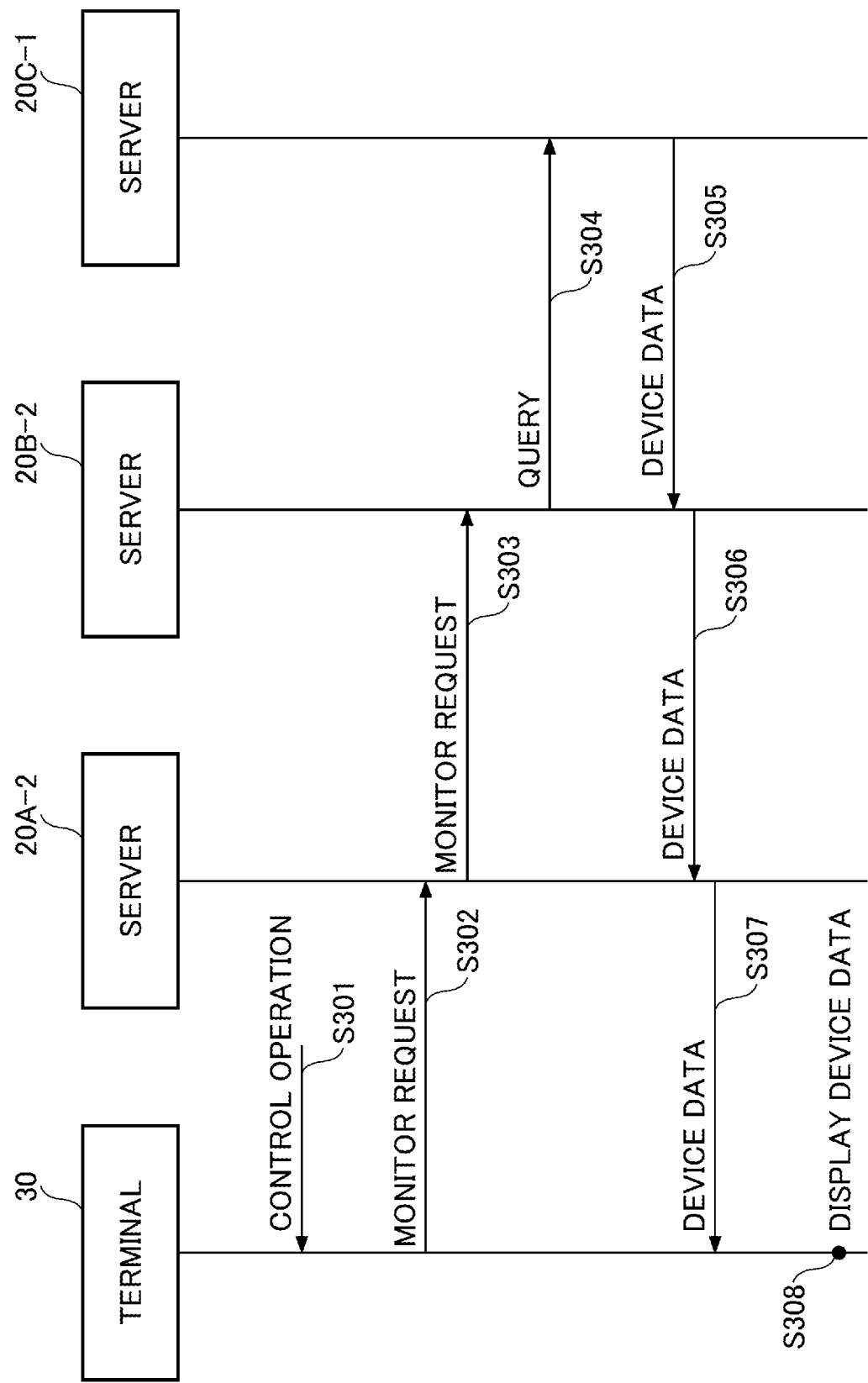
FIG. 7 is a sequence diagram illustrating an example of the processing in the remote monitoring function according to the embodiment.

An example of processing in providing the remote monitoring function (an example of a "second function") will be described with reference to FIG. 7. FIG. 7 is a sequence diagram illustrating an example of processing in the remote monitoring function according to the embodiment.

In step S301, the terminal 30 receives an operation from the user to remotely monitor the device 40. Then, the terminal 30 uses the API (an example of "second API of type 2") for remote monitoring provided by the server 20A-2 of the cloud system 200 to send a monitoring request corresponding to the operation to the server 20A-2 (step S302). Here, the terminal 30 may send, to the server 20A-2, an HTTP request that includes, for example, the ID of the API, the business operator ID, the device ID, and information specifying the monitoring content in an item (field) of a URL or the like.

Then, the server 20A-2 transfers the monitoring request to the server 20B-2 corresponding to the received monitoring request (step S303). Here, the server 20A-2 may determine the transfer destination of the monitoring request based on, for example, the URL of the monitoring request received from the terminal 30.

Then, the server 20B-2 transmits, to the server 20C-1, a request (query) to acquire the device data of the device 40 stored in the device DB 501, based on the received monitoring request (step S304).

Then, the server 20C-1 transmits the requested device data to the server 20B-2 (step S305). Here, the server 20C-1 transmits, to the server 20B-1, the device data recorded in the device DB 501 in association with the device ID of the device 40.

Then, the server 20B-2 transmits the device data to the server 20A-2 (step S306). Then, the server 20A-2 transmits the device data to the terminal 30 (step S307). Then, terminal 30 displays the received device data on the screen (step S308). Thus, the user of the terminal 30 can remotely ascertain, for example, the set temperature of the air conditioner, the room temperature, and the like.

<<Determination of the Usage Fee of the Cloud System 200 for Each Business Operator>>

Figure 8:
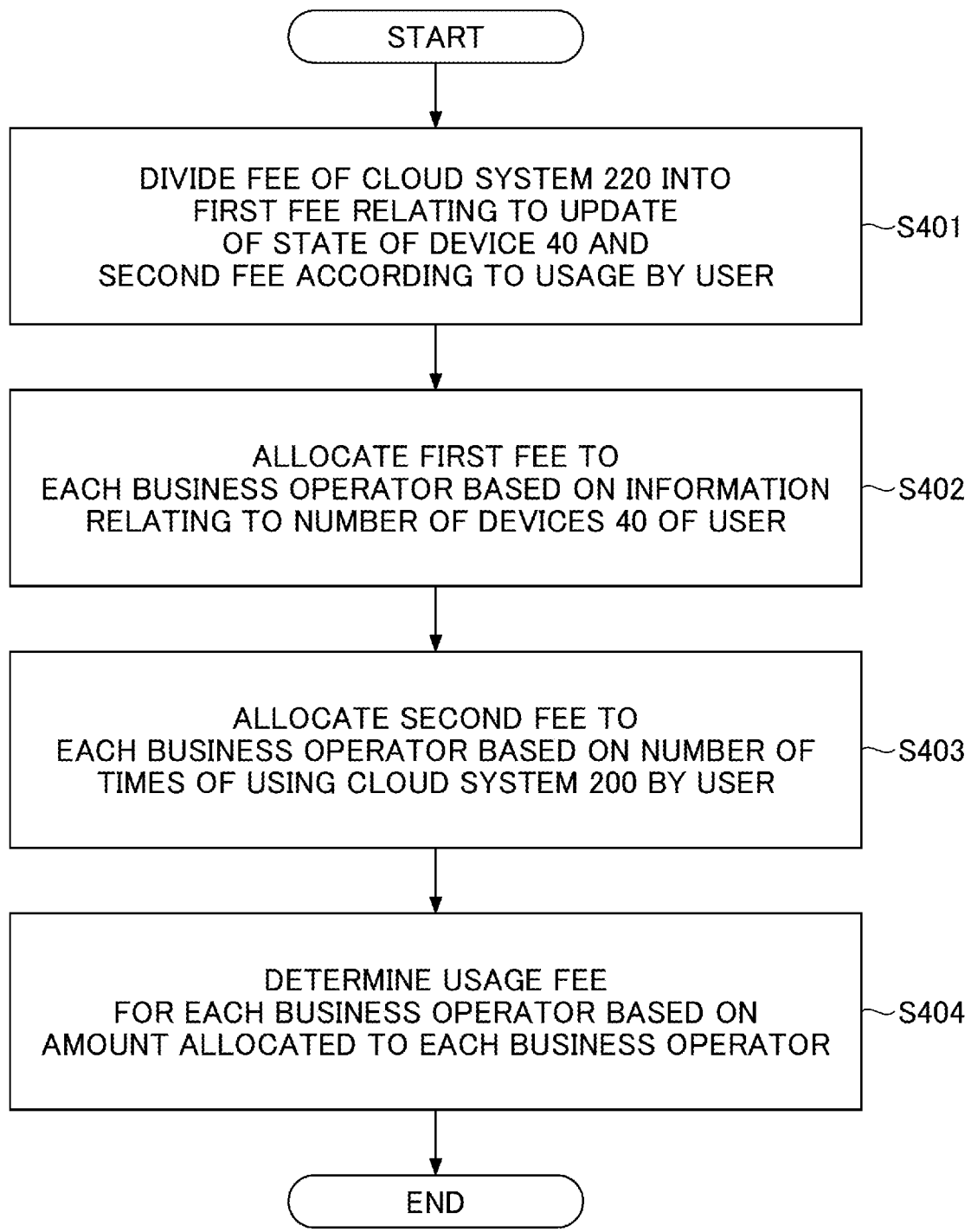
FIG. 8 is a flowchart illustrating an example of the processing in the server according to the embodiment.

An example of the processing performed by the server 20E when determining the usage fee (operation cost) of the cloud system 200 for each business operator for a predetermined period is described with reference to FIGS. 8 and 9. FIG. 8 is a flowchart illustrating an example of the processing performed by the server 20E according to the embodiment. FIG. 9 is a diagram explaining an example of the processing performed by the server 20E according to the embodiment.

In step S401, the calculating unit 22 divides the fee of the cloud system 200 in a predetermined period charged by the public cloud service provider, into the first fee of the cloud system 200 according to the use of the first API from the device 40 and the second fee of the cloud system 200 according to the use of the second API (different type of second API) from the terminal 30.

Then, the calculating unit 22 allocates (prorates) the first fee to each of the business operators, based on information relating to the number of devices 40 managed by each business operator by using the cloud system 200, with respect to each of the business operators (the business operator A, the business operator B, the business operator C), who is a user of the cloud system 200 (step S402).

Here, the calculating unit 22 may, for example, refer to the device DB 501 in FIG. 5 to calculate the number of devices 40 for each business operator. Moreover, the calculating unit 22 may, for example, refer to the device DB 501 in FIG. 5 to calculate the number of facilities in which the devices 40 are installed for each business operator.

Then, the calculating unit 22 may allocate the first fee to each business operator based on at least one of the number of the devices 40 for each business operator and the number of facilities in which the devices 40 are installed for each business operator. In this case, for example, it is assumed that there are 100 units of the devices 40 for the business operator A, 50 units of the devices 40 for the business operator B, 20 units of the devices 40 for the business operator C, and that the first fee is $340. In this case, the calculating unit 22 may allocate the fee of $200 (=100/(100+50+20)×340) for the business operator A, the fee of $100 (=50/(100+50+20)×340) for the business operator B, and the fee of $40 (=20/(100+50+20)×340) for the business operator C, as illustrated in FIG. 9.

Further, the calculating unit 22 may add a weight to the number of devices 40 for each business operator based on, for example, the frequency of registering the information of each device 40 stored in the cloud system 200 (the state registration frequency in FIG. 5). In this case, for example, it is assumed that there are 100 units of the devices 40 for the business operator A, 50 units of the devices 40 for the business operator B, and 20 units of the devices 40 for the business operator C, the first fee is $340, and the average value of the state registration frequency of the device 40 for the business operator A is one (number of times/hour), the average value of the state registration frequency of device 40 for business operator B is two (number of times/hour), and the average value of the state registration frequency of device 40 for business operator C is one (number of times/hour). In this case, the calculating unit 22 may allocate the fee of $155 (≈100×1/(100×1+50×2+20×1)×340) to the business operator A, the fee of $155 (≈50×2/(100×1+50×2+20× 1)×340) to the business operator B, and the fee of $31 (≈20×1/(100×1+50×2+20×1)×340) to the business operator C.

Subsequently, the calculating unit 22 allocates the second fee to each business operator on the basis of information on each business operator's record of using the cloud system 200 (step S403).

Here, the information on the usage record may include, for example, information indicating at least one of the number of times the cloud system 200 is used, the amount of data stored in the cloud system 200, the amount of communication data in the cloud system 200, the length of time the cloud system 200 is used, and the specification of each server 20 used in the cloud system 200.

The number of times the cloud system 200 is used by each business operator may include, for example, the number of times the second API is used from the terminal 30 of the user of each business operator. The amount of data stored in the cloud system 200 for each business operator may include, for example, the amount of data stored by each business operator recorded in the device DB 501 of the server 20C-1. The amount of communication data in the cloud system 200 for each business operator may include, for example, the amount of communication data between each device (for example, the terminal 30, each server 20, the device 40) generated by the use of the second API.

The usage time of the cloud system 200 by each business operator may include, for example, the usage time of each server 20 generated by the use of the second API (the time from the start to the end of processing at the server 20). The specifications of each server 20 used at the cloud system 200 by each business operator may include, for example, specifications such as the CPU, the memory, and the storage size of the server 20 when different servers 20 are used by each business operator.

For example, it is assumed that the number of times of usage by the business operator A is 800 times, the number of times of usage by the business operator B is 700 times, the number of times of usage by the business operator C is 300 times, and the second fee is $540. In this case, if the second fee is allocated based on the number of times the second API is used from the terminal 30 of the user of each business operator, the calculating unit 22 may allocate $240 (=800/(800+700+300)×540) to the business operator A, allocate $210 (=700/(800+700+300)×540) to the business operator B, and allocate $90 (=300/(800+700+300)×540) to the business operator C, as illustrated in FIG. 9.

Further, the calculating unit 22 may add a weight to the usage record of using the cloud system 200 based on the type of each API included in the second API. In this case, a weight coefficient based on the estimation of the design stage, for example, may be set in advance for each type of each API included in the second API. In this case, it is assumed that the weight coefficient of the second API of type 1 is set to "1.5" and the weight coefficient of the second API of type 2 is set to "1", and that the number of times the second API of type 1 is used by the business operator A is 600, the number of times the second API of type 2 is used by the business operator A is 200, the number of times the second API of type 1 is used by the business operator B is 550, the number of times the second API of type 2 is used by the business operator B is 150, the number of times the second API of type 1 is used by the business operator C is 100, the number of times the second API of type 2 is used by the business operator C is 200, and the second fee is $540. In this case, when a weight is added to the number of times the second API is used from the terminal 30 of the user of each business operator to allocate the second fee, the calculating unit 22 may allocate the second fee to the business operator A in the amount of $245 (≈(600×1.5+200×1)/{(600×1.5+200×1)+(550×1.5+150×1)+(1 00×1.5+200×1)}×540), to the business operator B in the amount of $217 (≈(550×1.5+150×1)/{(600×1.5+200×1)+(550×1.5+150×1)+(1 00×1.5+200×1)}×540), and to the business operator C in the amount of $78 (≈(100×1.5+200×1)/{(600×1.5+200×1)+(550×1.5+150×1)+(1 00×1.5+200×1)}×540).

Then, the calculating unit 22 calculates (determines) the usage fee for the cloud system 200 for each business operator based on the amount allocated to each business operator by the processing in steps S402 and S403 (hereafter also referred to as "allocated amount" as appropriate) (step S404). With this, the usage fee for each business operator can be determined by relatively easy processing, compared with, for example, the case in which the fee charged by the public cloud service provider is precisely calculated based on the fee table predetermined for the public cloud service provider and the log of the cloud system 200. Further, each business operator can relatively easily verify whether the amount of the determined usage fee is correct.

Here, the calculating unit 22 may, for example, add a predetermined amount (for example, a fixed amount) to the allocated amount of each business operator as the usage fee for each business operator. In this case, if the fixed amount for a predetermined period is $10 and the allocated amount is the amount indicated in FIG. 9, the usage fee for the business operator A is $450 (=200+240+10), the usage fee for the business operator B is $320 (=100+210+10), and the usage fee for the business operator C is $140 (=40+90+10).

Further, the calculating unit 22 may, for example, set the amount obtained by subtracting a particular amount from the allocated amount of each business operator as the usage fee for each business operator. The particular amount may include, for example, the amount of revenue (data usage fee) when other business operators (for example, the business operator B, the business operator Z, the delivery company, etc.) use the data of one business operator (for example, the business operator A) managed by the cloud system 200.

Modified Example

Each functional part of the server 20E may be provided in, for example, the business operator server 10.

As described above, it will be understood that various changes in form and details are possible without departing from the purpose and scope of the claims.

The present international application claims priority under Japanese Patent Application No. 2021-020631, filed on Feb. 12, 2021, the entire contents of which are incorporated herein by reference.

REFERENCE SIGNS LIST

1 communication system
10 business operator server
20 server
20A server
20B server
20C server
20D server
20E server
21 acquiring unit
22 calculating unit
23 output unit
30 terminal
40 device

The invention claimed is:

1. An information processing apparatus comprising:
a memory; and
a processor, the processor being configured to:
calculate a usage fee relating to a cloud service with respect to each of a plurality of business operators, based on both of information relating to a quantity of a plurality of devices managed by each of the plurality of business operators by using the cloud service, and information relating to a usage record of using the cloud service by each of the plurality of business operators, wherein information relating to the quantity of the plurality of devices managed by using the cloud service includes at least one of a number of the plurality of devices stored in the cloud service or a number of facilities in which the plurality of devices are installed, the cloud service being constructed by using a public cloud service,
divide a fee charged by the public cloud service into a first fee of the cloud service incurred by using a first API (Application Programming Interface) that registers a state of each of the plurality of devices stored in the cloud service, and a second fee of the cloud service incurred by using a second API provided by the cloud service,
allocate the first fee to each of the plurality of business operators based on the information relating to the quantity of the plurality of devices managed by each of the plurality of business operators by using the cloud service, and
allocate the second fee to each of the plurality of business operators based on the information relating to the usage record of using the cloud service by each of the plurality of business operators,
determine the information relating to the quantity of the plurality of devices managed of the plurality of devices by using the cloud service based on information relating to the state of each of the plurality of devices stored in the cloud service and registered by the first API, and
add weight to the information relating to the quantity of the plurality of devices managed by using the cloud service, by multiplying an average value of a frequency of registering the state of each of the devices stored in the cloud service by the number of the plurality of devices stored in the cloud service,
wherein the second fee is allocated at least in part based on an operation according to a command or a request received by a first device of the plurality of devices from a server; and
wherein the first device receives the command or the request from the server, and the first device executes the operation according to the received command or the received request, including remotely setting a temperature of the first device, setting an airflow of the first device, selecting an operation mode of the first device, or measuring a temperature or a humidity of an indoor environment.

2. The information processing apparatus according to claim 1, wherein the information relating to the usage record of using the cloud service includes at least one of a number of times of using the cloud service, an amount of data stored in the cloud service, an amount of communication data in the cloud service, a length of time of using the cloud service, or a specification of the server.

3. The information processing apparatus according to claim 2, wherein the information relating to the usage record of using the cloud service includes information indicating a number of times of executing, by each of the plurality of business operators, the second API.

4. The information processing apparatus according to claim 3, wherein
the second API includes APIs each providing one of a plurality of functions, and
the information relating to the usage record of using the cloud service includes the information indicating the number of times of executing the second API.

5. The information processing apparatus according to claim 4, wherein the processor is configured to add weight to the information relating to the usage record of using the cloud service, by multiplying the number of times of executing the second API by a weight coefficient set in advance with respect to a type of each of the APIs included in the second API.

6. An information processing method of executing a process by an information processing apparatus, the information processing method comprising:
calculating a usage fee relating to a cloud service with respect to each of a plurality of business operators, based on both of information relating to a quantity of a plurality of devices managed by each of the plurality of business operators by using the cloud service, and information relating to a usage record of using the cloud service by each of the plurality of business operators, wherein information relating to the quantity of the plurality of devices managed by using the cloud service includes at least one of a number of the plurality of devices stored in the cloud service or a number of facilities in which the plurality of devices are installed, the cloud service being constructed by using a public cloud service,
the calculating includes dividing a fee charged by the public cloud service into a first fee of the cloud service incurred by using a first API (Application Programming Interface) that registers a state of each of the plurality of devices stored in the cloud service, and a second fee of the cloud service incurred by using a second API provided by the cloud service,
the calculating includes allocating the first fee to each of the plurality of business operators based on the information relating to the quantity of the plurality of devices managed by each of the plurality of business operators by using the cloud service,
the calculating includes allocating the second fee to each of the plurality of business operators based on the information relating to the usage record of using the cloud service by each of the plurality of business operators,
the calculating includes determining the information relating to the quantity of the plurality of devices managed of the plurality of devices by using the cloud service based on information relating to the state of each of the plurality of devices stored in the cloud service and registered by the first API, and
the calculating includes adding weight to the information relating to the quantity of the plurality of devices managed by using the cloud service, by multiplying an average value of a frequency of registering the state of each of the devices stored in the cloud service by the number of the plurality of devices stored in the cloud service, wherein the second fee is allocated at least in part based on an operation according to a command or a request received by a first device of the plurality of devices from a server; and
wherein the first device receives the command or the request from the server, and the first device executes the operation according to the received command or the received request, including remotely setting a temperature of the first device, setting an airflow of the first device, selecting an operation mode of the first device, or measuring a temperature or a humidity of an indoor environment.

7. A non-transitory computer readable medium storing a program executable by an information processing apparatus to perform operations, the operation comprising:
calculating a usage fee relating to a cloud service with respect to each of a plurality of business operators, based on both of information relating to a quantity of a plurality of devices managed by each of the plurality of business operators by using the cloud service, and information relating to a usage record of using the cloud service by each of the plurality of business operators, wherein information relating to the quantity of the plurality of devices managed by using the cloud service includes at least one of a number of the plurality of devices stored in the cloud service or a number of facilities in which the plurality of devices are installed, the cloud service being constructed by using a public cloud service,
the calculating includes dividing a fee charged by the public cloud service into a first fee of the cloud service incurred by using a first API (Application Programming Interface) that registers a state of each of the plurality of devices stored in the cloud service, and a second fee of the cloud service incurred by using a second API provided by the cloud service,
the calculating includes allocating the first fee to each of the plurality of business operators based on the information relating to the quantity of the plurality of devices managed by each of the plurality of business operators by using the cloud service,
the calculating includes allocating the second fee to each of the plurality of business operators based on the information relating to the usage record of using the cloud service by each of the plurality of business operators,
the calculating includes determining the information relating to the quantity of the plurality of devices managed of the plurality of devices by using the cloud service based on information relating to the state of each of the plurality of devices stored in the cloud service and registered by the first API, and
the calculating includes adding weight to the information relating to the quantity of the plurality of devices managed by using the cloud service, by multiplying an average value of a frequency of registering the state of each of the devices stored in the cloud service by the number of the plurality of devices stored in the cloud service,
wherein the second fee is allocated at least in part based on an operation according to a command or a request received by a first device of the plurality of devices from a server; and
wherein the first device receives the command or the request from the server, and the first device executes the operation according to the received command or the received request, including remotely setting a temperature of the first device, setting an airflow of the first device, selecting an operation mode of the first device, or measuring a temperature or a humidity of an indoor environment.

* * * * *